May 19, 1970  T. M. ALEXANDER ET AL  3,512,880

GLARE-PROTECTIVE EYEGLASSES

Filed Jan. 2, 1968

Thomas M. Alexander
Chester M. Landes
Jurgen R. Meyer-Arendt
INVENTORS

BY

Kolisch + Hartwell

Attys.

United States Patent Office 3,512,880
Patented May 19, 1970

3,512,880
GLARE-PROTECTIVE EYEGLASSES
Thomas M. Alexander, 1145 W. 45th Ave., Chester M. Landes, 3115 E. 14th Ave., both of Albany, Oreg. 97321, and Jurgen R. Meyer-Arendt, Forest Grove, Oreg.; said Meyer-Arendt assignor of eleven and two-thirds percent each to said Alexander and Landes
Filed Jan. 2, 1968, Ser. No. 694,899
Int. Cl. G02c 7/10, 7/16
U.S. Cl. 351—45          2 Claims

ABSTRACT OF THE DISCLOSURE

Glare-protective eyeglasses with lenses featuring light-absorbent portions starting along vertical lines spaced laterally from visual axis centers in the lenses. The light-absorbent portions increase gradually in light absorbency progressing laterally from the visual axis centers of the lenses.

---

This invention relates to eyeglasses for protecting a wearer's eyes from glare, and more specifically, to such eyeglasses which provide protection from glare resulting from light emanating from a source located forwardly and to one side of the wearer's head.

When driving at night the glare produced by oncoming vehicle headlights may be quite bothersome to many drivers, producing a dangerous distraction in some instances, eye fatigue, strain, loss of light sensitivity, etc. The wearing of ordinary sunglasses to reduce the effects of such glare has not been satisfactory since such glasses usually have lenses that are light-absorbent throughout their entire expanses and as a result overall vision is significantly impaired.

A general object of this invention is to provide improved eyeglasses for protecting a wearer's eyes against glare, such as is produced by the oncoming headlights of a vehicle, which permit substantially unhindered vision in a direction viewing straight ahead.

This invention is bottomed on the finding that the most troublesome glare from oncoming headlights occurs with the headlight source angularly displaced at about 25° from a line projected straight ahead from the viewer's eyes, and that this is true with respect to both eyes, even though one is spaced laterally from the other. The invention, therefore, features eyeglasses having glare-protective, light-absorbent portions starting from vertical lines that, with respect to each eye shielded by the eyeglass, is offset laterally from the visual axis center of the eyeglass lens, such offset being the same for both eyes. The invention also recognizes that with eyeglasses, the geometric centers of the lenses are located laterally outwardly on the lenses from the visual axis centers for the lenses, for cosmetic reasons and to afford greater protection for portions of the eyes located toward the temporal sides of the head (portions of the eyes located toward the nose receiving a degree of protection from the nose). As a consequence, lenses of eyeglasses constructed as contemplated have light-absorbent portions which are unequal in expanse.

A specific object is to provide such glare-protective eyeglasses which have light-absorbent portions that increase in light absorbency gradually, progressing from regions adjacent the visual axis centers of the lenses laterally of the lenses in a common direction toward one side of the wearer's head.

Figure 2:
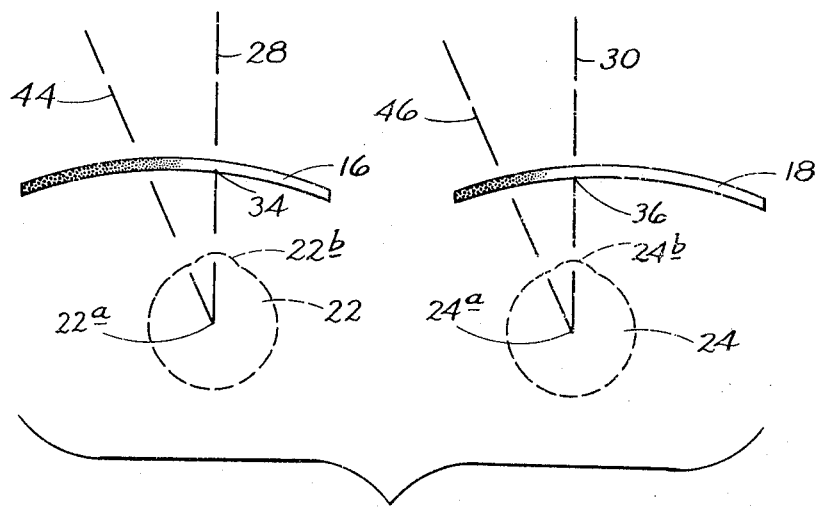
Figure 1:
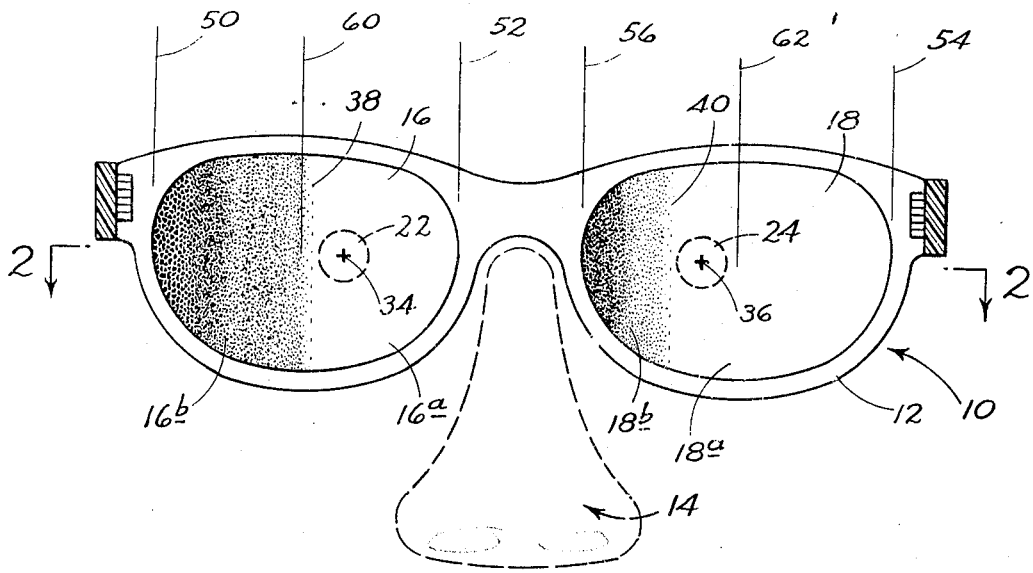

These and other objects and advantages will become more fully apparent as the following description is read in conjunction with the accompanying drawings, wherein:

FIG. 1 is an elevation view of a pair of eyeglasses constructed according to an embodiment of the invention, viewing the back side of lenses in the eyeglasses; and FIG. 2 is a cross-sectional view, taken along the line 2—2 in FIG. 1, showing the lenses of the eyeglasses and in a diagrammatic manner the position of a wearer's eyes, to indicate relative positioning of the lenses with respect to such eyes.

Referring now to the drawings and first more particularly to FIG. 1, at 10 is indicated generally glare-protective eyeglasses according to the invention. The eyeglasses include a frame 12 adapted to rest at its midregion on the bridge of a wearer's nose, the general usual position of such a nose being illustrated in dashed outline at 14.

Frame 12 mounts a pair of laterally-spaced lenses 16, 18. With the eyeglasses in place, lens 16, referred to as the left lens, is disposed forwardly of the wearer's left eye 22, and lens 18, referred to as the right lens, is disposed forwardly of the wearer's right eye 24, as is best illustrated in FIG. 2. The corneas of eyes 22, 24 are shown also in dashed outline in FIG. 1, to indicate their positions relative to the lenses in elevation. The lenses may be made of either glass or plastic, and may be ground to a prescription, or have no refractive power.

Referring specifically to FIG. 2, eye 22 has a center of rotation 22a and eye 24 has a center of rotation 24a, about which centers the respective eyes may be rotated in unison with normal usage of the eyes. The lenses normally are positioned about 27 millimeters forwardly of these centers of rotation. The pupils of the eyes are indicated generally at 22b, 24b. A line 28 extending through center of rotation 22a and the center of pupil 24b (and a line 30 extending through center of rotation 24a and the center of pupil 24b) indicate the lines of sight of the eyes with the eyes looking straight forward. Line 28 intersects lens 16 at a point 34, referred to as the visual axis center of the left lens, and line 30 intersects lens 18 at a point 36, referred to as the visual axis center of the right lens. Visual axis centers 34, 36 are indicated by crosses in FIG. 1.

Each of lenses 16, 18 has a transparent, or clear portion (16a, 18a, respectively), and a light-absorbent, or shaded portion (16b, 18b, respectively). The light-absorbent portions of the lenses may be produced by coating a material onto the lenses, or by directly incorporating a light-absorbent material into the glass or plastic composing the lenses, by known methods. In any event, the light-absorbent portions reduce the amount of light passing through the lenses without impeding the recognition of detail. Thus, the lenses are not translucent (in the sense that light without detail passes through them).

Light-absorbent portions 16b, 18b are graduated in density, starting at regions of minimum light absorbency along substantially vertical lines 38, 40, respectively, and gradually increase in light absorbency progressing toward one side of the wearer's head (in this case to the left). Ordinarily a region of maximum light absorbency in each lens is located immediately adjacent the extreme left of the lens. Lines 38, 40 are both spaced laterally, to the left of the visual axis centers of the lenses. Thus, a person wearing the eyeglasses is able to see straight ahead, or to the right (through the clear portions of the glasses) and his eyes will be shaded against glare from a light source positioned toward the left of his head.

Because of the fact that typically a person's eyes may be approximately 63 millimeters apart (measuring between their centers of rotation), it might be assumed that with normal right-hand driving (as is practiced in most countries of the world, whereby oncoming traffic appears from the left lane), glare irritating effects would be most pronounced for the left eye in a field of vision which was more directly ahead of the eye, than for the right eye. However, careful studies of actual nighttime driving conditions, substantiated by mathematical calculations, taking into account the observable intensity changes that take place in a light source when such is moved toward a viewer, and the fact that light sensitivity also is a function of the angle that light enters the eye, have demonstrated that the irritating effects of glare caused by oncoming headlights are at a maximum when the source of such light is at an angle of about 25° from a line projecting straight forwardly of the eye, and this is true for both eyes. Thus, in FIG. 2 lines 44, 46 are indicated which extend forwardly at a 25° angle to lines 28, 38, respectively, and which indicate diagrammatically the angle at which light radiating from an oncoming vehicle's headlights has been found to be most troublesome to the eyes of a driver. Recalling that the distance from centers of rotation 22a, 24a to the lenses associated therewith is about 27 millimeters, calculations will establish that lines 44, 46 pass through the respective lenses at points spaced approximately 12 millimeters to the left of visual axis centers 34, 36.

The vertical lines 38, 40 (along which start the light-absorbent portions of the lenses) are each located within the range of about 5 to 7 millimeters, and no more than 10 millimeters, to the left of the visual axis center of the lenses. This spacing assures the wearer of clear and unobstructed vision straight ahead, and to the right. The gradual increase in light absorbency, in regions 16b, 18b, is such as to provide at least 50 percent of maximum light absorbency in the regions wherein lines 44, 46 pass through the respective lenses. When eyeglasses are worn, variations result in the distance between the center of rotation of an eye and the lens in front of it. To provide sufficient latitude for such variations, the region of 50 percent of maximum light absorbency should lie within a range of from about 10 to 14 millimeters laterally of the lens visual axis center, with this distance usually falling at about 12 millimeters. The increase in light absorbency, from vertical lines 38, 40 to regions of 50 percent maximum light absorbency, should occur over a lateral distance of at least about 2 millimeters. This gradual increase in light absorbency, from the clear portions of the lenses to the regions of significant light absorbency, means that a wearer's eyes need not have to make abrupt adjustments for light variations when the angle of entering light changes, and is a factor in preventing eye fatigue.

In FIG. 1, the extreme temporal margin of lens 16 is indicated by line 50, and the extreme nasal margin for the lens is indicated by line 52. Similarly, the extreme temporal margin of lens 18 is indicated by line 54 and the extreme nasal margin is indicated by line 56. The geometric center of left lens 16 is located along a line halfway between lines 50, 52, and similarly, the geometric center of the right lens is halfway between lines 54, 56. It should be noted that the geometric center of each lens (indicated at 60, 62, respectively) is located laterally outwardly of the visual axis center of that lens. A greater expanse of lens is thus provided on the temporal side of the visual axis center of each lens than on the nasal side. This greater expanse is provided for cosmetic reasons, nad to increase the lateral outward angle through which the line of sight of an eye may be rotated and continue to pass through a lens (the nose limits the lateral inward angle). With the geometric centers of the lenses starting at vertical lines which are spaced at substantially equal distances from their respective visual axis centers, it will be noted that the left lens has a greater expanse of light-absorbent portion than does the right lens.

When wearing the eyeglasses, the wearer will be protected against glare from the headlights of an oncoming vehicle from the time the angle between the oncoming car and the driver's straight-ahead line of sight is such as to bring the beams of the headlights into the regions of lines 38, 40. As the oncoming vehicle approaches closer to the wearer, the angle between the wearer's straight-ahead line of sight and the line extending to the oncoming vehicle increases, so that the wearer is protected by the increase of light absorbency of the lenses on progressing in the direction of increased angle. Should the wearer feel the need for added protection against glare, he need merely turn his head slightly away from the oncoming car, and a region of greater light absorbency on each of the light-absorbent portions of the lenses will move into position between the wearer's eyes and the oncoming vehicle.

While this invention has been described in connection with conventional eyeglass frames adapted to rest on the ears, of course, the invention is applicable to other eyeglass configurations, such as, for instance, so-called "clip-ons" which includes frames clipped onto ear-supported eyeglasses.

It is claimed and desired to secure by Letters Patent:

1. Glare-protective eyeglasses comprising a frame and a pair of laterally spaced lenses mounted on said frame, said lenses having geometric centers located laterally outwardly on the lenses with respect to visual axis centers for the lenses, said lenses having light-absorbent portions starting along substantially vertical lines spaced laterally in a common direction from the visual axis centers for the lenses, the light-absorbent portion in the case of one lens extending from said vertical line to the temporal margin of the lens and the light-absorbent portion in the case of the other lens extending from said vertical line to the nasal margin of the lens whereby there is less of a light-absorbent portion in said other lens than said one lens, the vertical line starting the light-absorbent portion of each of said lenses being laterally spaced not less than five and not more than about ten millimeters from the visual axis center of the lens.

2. The eyeglasses of claim 1, wherein the light-absorbent portion of each of said lenses increases in light absorbency gradually over a lateral expanse of at least about two millimeters, and has at least 50 percent of maximum light absorbency in a region spaced from 10 to 14 millimeters laterally of the visual axis center for the lens.

References Cited

UNITED STATES PATENTS 1,239,691  9/1917  Howe _____ 351—45

FOREIGN PATENTS 297,095    5/1965   Netherlands.
1,134,943  12/1956  France.

DAVID SCHONBERG, Primary Examiner

R. L. SHERMAN, Assistant Examiner

U.S. Cl. X.R.

350—276